US011809532B2

(12) United States Patent
Van Foreest et al.

(10) Patent No.: US 11,809,532 B2
(45) Date of Patent: Nov. 7, 2023

(54) DETECTION OF MODIFICATION OF AN ITEM OF CONTENT

(71) Applicant: IRDETO B.V., Hoofddorp (NL)

(72) Inventors: Arnoud Van Foreest, Hoofddorp (NL); Kimon Tsitsikas, Hoofddorp (NL); Vyacheslav Shoshin, Hoofddorp (NL); Chunqiu Lu, Hoofddorp (NL); Lin Yuan, Hoofddorp (NL); Yu Duan, Hoofddorp (NL); Maksym Koshel, Hoofddorp (NL); Kostiantyn Shevchenko, Hoofddorp (NL); Svetislav Momcilovic, Hoofddorp (NL); Vladimir Zivkovic, Hoofddorp (NL)

(73) Assignee: Irdeto B.V., Hoofddorp (NL)

( * ) Notice: Subject to any disclaimer, the term of this patent is extended or adjusted under 35 U.S.C. 154(b) by 246 days.

(21) Appl. No.: 17/069,952

(22) Filed: Oct. 14, 2020

(65) Prior Publication Data
US 2022/0114241 A1    Apr. 14, 2022

(51) Int. Cl.
*G06F 21/16*    (2013.01)
*G06F 21/64*    (2013.01)

(52) U.S. Cl.
CPC .............. *G06F 21/16* (2013.01); *G06F 21/64* (2013.01)

(58) Field of Classification Search
CPC ................................. G06F 21/16; G06F 21/64
(Continued)

(56) References Cited

U.S. PATENT DOCUMENTS 6,512,837 B1 * 1/2003 Ahmed .............. H04N 1/32229
382/100
6,829,367 B1 * 12/2004 Toyokawa .............. G06T 1/005
380/202
(Continued)

OTHER PUBLICATIONS

Extended European Search Report dated Mar. 4, 2022.
(Continued)

*Primary Examiner* — Thanh T Le
(74) *Attorney, Agent, or Firm* — Rimon PC; Marc S. Kaufman

(57) ABSTRACT

A method for detection of modification of an item of content, the method comprising: obtaining, for the item of content, a respective first value of each attribute in a set of one or more attributes of the item of content, the set of one or more attributes selected such that, for each of one or more predetermined types of modification, said type of modification affects the value of at least one attribute in the set of one or more attributes; performing a watermark decoding operation on the item of content; and in response to the watermark decoding operation producing payload data from the item of content: determining that the one or more predetermined types of modification have not been applied to the item of content if, for each attribute in the set of one or more attributes, the respective first value for that attribute matches a respective second value for that attribute determined using the payload; or determining that a modification has been applied to the item of content if, for at least one attribute in the set of one or more attributes, the respective first value for that attribute does not match a respective second value for that attribute determined using the payload.

20 Claims, 6 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 6,993,154 B2* | 1/2006 | Brunk | ..................... | G06F 18/00 |
| | | | | 713/176 |
| 7,146,498 B1* | 12/2006 | Takechi | ................. | H04N 5/913 |
| | | | | 713/176 |
| 8,818,020 B2* | 8/2014 | Guan | ..................... | G06T 1/0028 |
| | | | | 713/176 |
| 11,243,302 B2 | 2/2022 | Hamada et al. | | |
| 11,308,185 B1* | 4/2022 | Paczkowski | .............. | H04L 9/50 |
| 2012/0151215 A1* | 6/2012 | Lee | ........................... | H04L 9/32 |
| | | | | 713/176 |
| 2013/0208942 A1* | 8/2013 | Davis | ..................... | H04N 19/14 |
| | | | | 382/100 |
| 2013/0259228 A1* | 10/2013 | Ren | ....................... | H04L 9/3236 |
| | | | | 380/200 |
| 2014/0129841 A1* | 5/2014 | McMillan | ................. | H04L 9/36 |
| | | | | 713/176 |
| 2015/0215492 A1* | 7/2015 | De Vuono | ......... | H04N 1/32144 |
| | | | | 382/100 |
| 2018/0253567 A1* | 9/2018 | Gonzalez-Banos | ......................... | |
| | | | | H04N 21/8358 |
| 2019/0294762 A1* | 9/2019 | Prem Bianzino | ....... | G06F 16/00 |
| 2020/0267404 A1* | 8/2020 | Levy | ..................... | G06T 1/0028 |
| 2021/0124919 A1* | 4/2021 | Balakrishnan | ....... | G06V 30/418 |
| 2021/0173903 A1* | 6/2021 | Choudhury | ......... | G06F 16/2255 |
| 2021/0334931 A1* | 10/2021 | Kwon | ................... | H04N 19/467 |
| 2022/0124393 A1* | 4/2022 | Wang | ..................... | H04L 9/0825 |

OTHER PUBLICATIONS

Second Draft of PDTR for potential second edition of ISO/IEC 21000-11, 70. MPEG Meeting; Oct. 18, 2004-Oct. 22, 2004; Palma De Mallorca; (Motion Picture Expert Group or ISO/IEC JTC1/SC29/WG11; Jul. 2004; 46 pages.

Guerra, et al. "An Ill-Posed Operator for Secure Image Authentication." IEEE Transactions on Circuits and Systems for Video Technology; Aug. 2003; pp. 842-852; vol. 13(8).

Sun, et al., "A Secure and Robust Authentication Scheme for Video Transcoding." IEEE Transactions on Circuits and Systems for Video Technology; Oct. 2006; pp. 1232-1244; vol. 16(10).

Wolfgang, et al., "Perceptual Watermarks for Digital Images and Video" Proceedings of the IEEE; Jul. 1999; pp. 1108-1126; vol. 87(7).

* cited by examiner

DETECTION OF MODIFICATION OF AN ITEM OF CONTENT

FIELD OF THE INVENTION

The present invention relates to methods for enabling detection of modification of an item of content, methods for detection of modification of an item of content, and systems and computer programs for carrying out such methods.

BACKGROUND OF THE INVENTION

Digital watermarking of content is very well known. Herein, the term "content", or an "item of content", may refer to any type of information, and may, for example, include one or more of audio data, image data, video data, textual data, multimedia data, a web page, software products, security keys, experimental data or any other kind of data. There are many methods for performing digital watermarking of content but, in general, they all involve adding a watermark to an item of content. This involves embedding, or adding, a watermark payload (or watermark symbols, or a watermark codeword, or payload data) into the original item of content to form a watermarked item of content. The watermarked item of content can then be distributed to one or more users (or recipients or receivers).

The method used for adding a watermark to an item of content depends on the intended purpose of the watermark. Some watermarking techniques are designed to be "robust", in the sense that the embedded watermark payload can be successfully decoded even if the watermarked item of content has undergone subsequent processing (be that malicious or otherwise). Some watermarking techniques are designed to be "fragile", in the sense that the embedded watermark payload cannot be successfully (or completely) decoded if the watermarked item of content has undergone subsequent processing or modification. Some watermarking techniques are designed such that the difference between the original item of content and the watermarked item of content is substantially imperceptible to a human user (e.g. the original item of content and the watermarked item of content are visually and/or audibly indistinguishable to a human user). Other criteria for how a watermark is added to an item of content exist.

SUMMARY OF THE INVENTION

According to a first aspect of the invention, there is provided a method for enabling detection of modification of an item of content, the method comprising: obtaining, for the item of content, a respective value of each attribute in a set of one or more attributes of the item of content, the set of one or more attributes selected such that, for each of one or more predetermined types of modification, said type of modification affects the value of at least one attribute in the set of one or more attributes; and watermarking the item of content to embed payload data within the item of content, wherein the payload data comprises (a) the respective value for each attribute in the set of one or more attributes and/or (b) an identifier for retrieving, from a storage, the respective value for each attribute in the set of one or more attributes.

The method may further comprise storing, in the storage, the respective value of each attribute in the set of one or more attributes.

According to a second aspect of the invention, there is provided a method for detection of modification of an item of content, the method comprising: obtaining, for the item of content, a respective first value of each attribute in a set of one or more attributes of the item of content, the set of one or more attributes selected such that, for each of one or more predetermined types of modification, said type of modification affects the value of at least one attribute in the set of one or more attributes; performing a watermark decoding operation on the item of content; and in response to the watermark decoding operation producing payload data from the item of content: determining that the one or more predetermined types of modification have not been applied to the item of content if, for each attribute in the set of one or more attributes, the respective first value for that attribute matches a respective second value for that attribute determined using the payload; or determining that a modification has been applied to the item of content if, for at least one attribute in the set of one or more attributes, the respective first value for that attribute does not match a respective second value for that attribute determined using the payload.

Determining that a modification has been applied to the item of content may comprise determining that at least one of the one or more predetermined types of modification has been applied to the item of content if, for at least one attribute in the set of one or more attributes, the respective first value for that attribute does not match a respective second value for that attribute determined using the payload.

The respective first value for an attribute may match a respective second value for that attribute if either: (a) the first value equals the second value; or (b) a difference between the first value and the second values is less than a predetermined threshold.

The method may further comprise using the payload data to obtain, from a storage, the respective second value for each attribute in the set of one or more attributes of the item of content. The payload data may then comprise an identifier of a record in a database storing the respective second value for each attribute in the set of one or more attributes of the item of content.

For the first and second aspects, the one or more predetermined types of modification may comprise one or more of: (a) a change in standard or format of the item of content; (b) a change to the contents of the item of content.

According to a third aspect of the invention, there is provided a system for enabling detection of modification of an item of content, the system comprising one or more processors arranged to: obtain, for the item of content, a respective value of each attribute in a set of one or more attributes of the item of content, the set of one or more attributes selected such that, for each of one or more predetermined types of modification, said type of modification affects the value of at least one attribute in the set of one or more attributes; and watermark the item of content to embed payload data within the item of content, wherein the payload data comprises (a) the respective value for each attribute in the set of one or more attributes and/or (b) an identifier for retrieving, from a storage, the respective value for each attribute in the set of one or more attributes.

The system may be further arranged to store, in the storage, the respective value of each attribute in the set of one or more attributes.

According to a fourth aspect of the invention, there is provided a system for detection of modification of an item of content, the system comprising one or more processors arranged to: obtain, for the item of content, a respective first value of each attribute in a set of one or more attributes of the item of content, the set of one or more attributes selected such that, for each of one or more predetermined types of modification, said type of modification affects the value of at least one attribute in the set of one or more attributes; perform a watermark decoding operation on the item of content; and in response to the watermark decoding operation producing payload data from the item of content: determine that the one or more predetermined types of modification have not been applied to the item of content if, for each attribute in the set of one or more attributes, the respective first value for that attribute matches a respective second value for that attribute determined using the payload; or determine that a modification has been applied to the item of content if, for at least one attribute in the set of one or more attributes, the respective first value for that attribute does not match a respective second value for that attribute determined using the payload.

Determining that a modification has been applied to the item of content may comprise determining that at least one of the one or more predetermined types of modification has been applied to the item of content if, for at least one attribute in the set of one or more attributes, the respective first value for that attribute does not match a respective second value for that attribute determined using the payload.

The respective first value for an attribute may match a respective second value for that attribute if either: (a) the first value equals the second value; or (b) a difference between the first value and the second values is less than a predetermined threshold.

The system may be further arranged to use the payload data to obtain, from a storage, the respective second value for each attribute in the set of one or more attributes of the item of content. The payload data may then comprise an identifier of a record in a database storing the respective second value for each attribute in the set of one or more attributes of the item of content.

For the third and fourth aspects, the one or more predetermined types of modification may comprise one or more of: (a) a change in standard or format of the item of content; (b) a change to the contents of the item of content.

According to a fifth aspect of the invention, there is provided a computer program which, when executed by one or more processors, causes the one or more processors to carry out the method according to the first or second aspect, or any embodiment thereof. The computer program may be stored on a computer readable medium.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
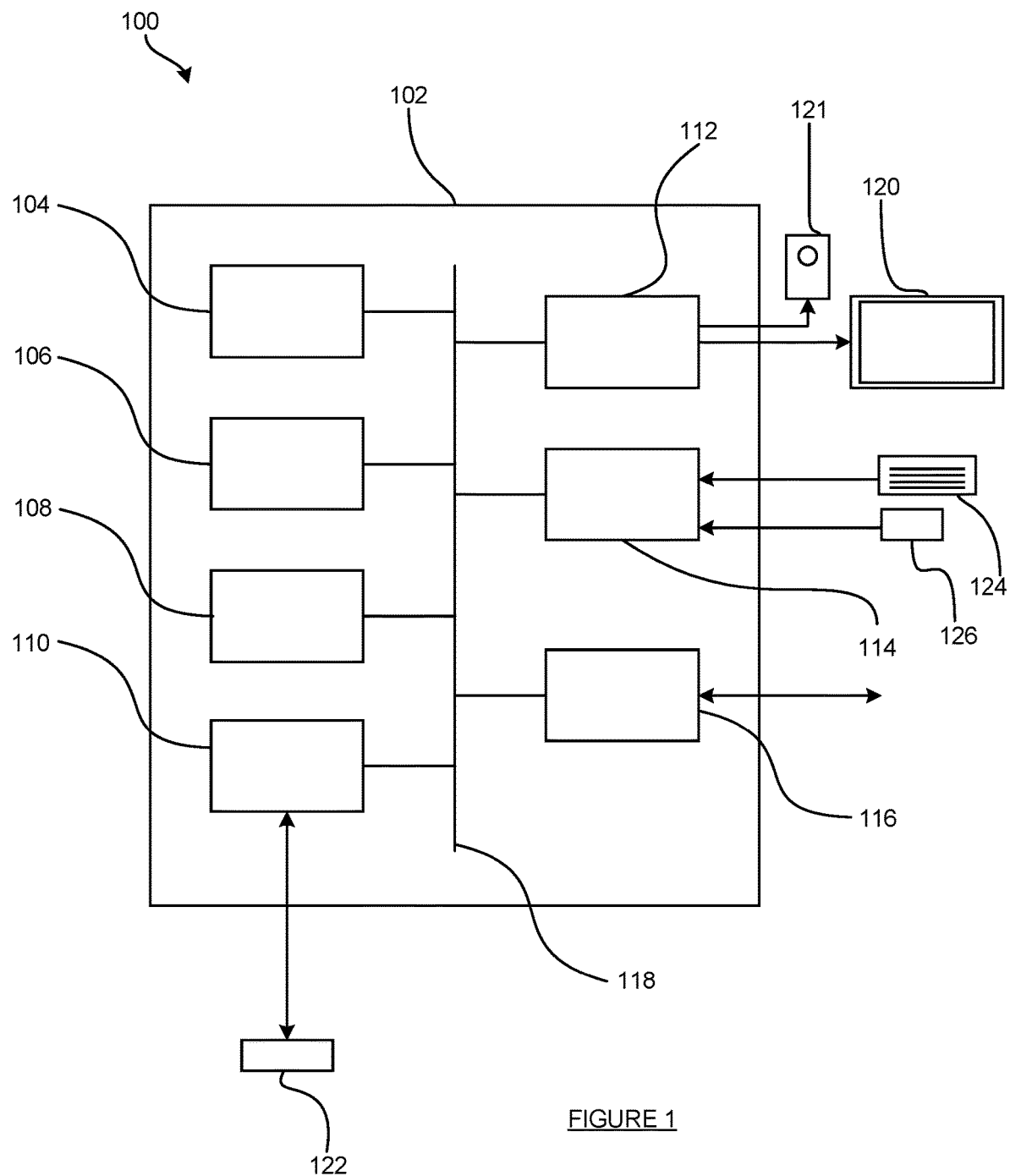
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which may be linked together over one or more communication buses 118.

The storage medium 104 may be any form of non-volatile data storage device such as one or more of a hard disk drive, a magnetic disc, a solid-state-storage device, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to and/or removable from the computer 102. The device 122 may be a data storage device, for example, one or more of an optical disc, a magnetic disc, a solid-state-storage device, etc. The device 122 may have processing capabilities—for example, the device may be a smart card. The device 122 may generate data for provision to the computer 102 via the interface 110—for example, the device 122 could comprise a microphone for generating and providing audio input and/or a camera for generating and providing image/video input. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer; a mobile telephone; a tablet; a laptop; a television set; a set top box; a games console; other mobile devices or consumer electronics devices; etc. It is possible that the components of the computer system 100 may be distributed across multiple devices, e.g. some of the components may be located in a cloud or other computer network; some of the components may be located in peripheral devices such as mobile phones, smartphones and smart watches; etc.

Figure 2:
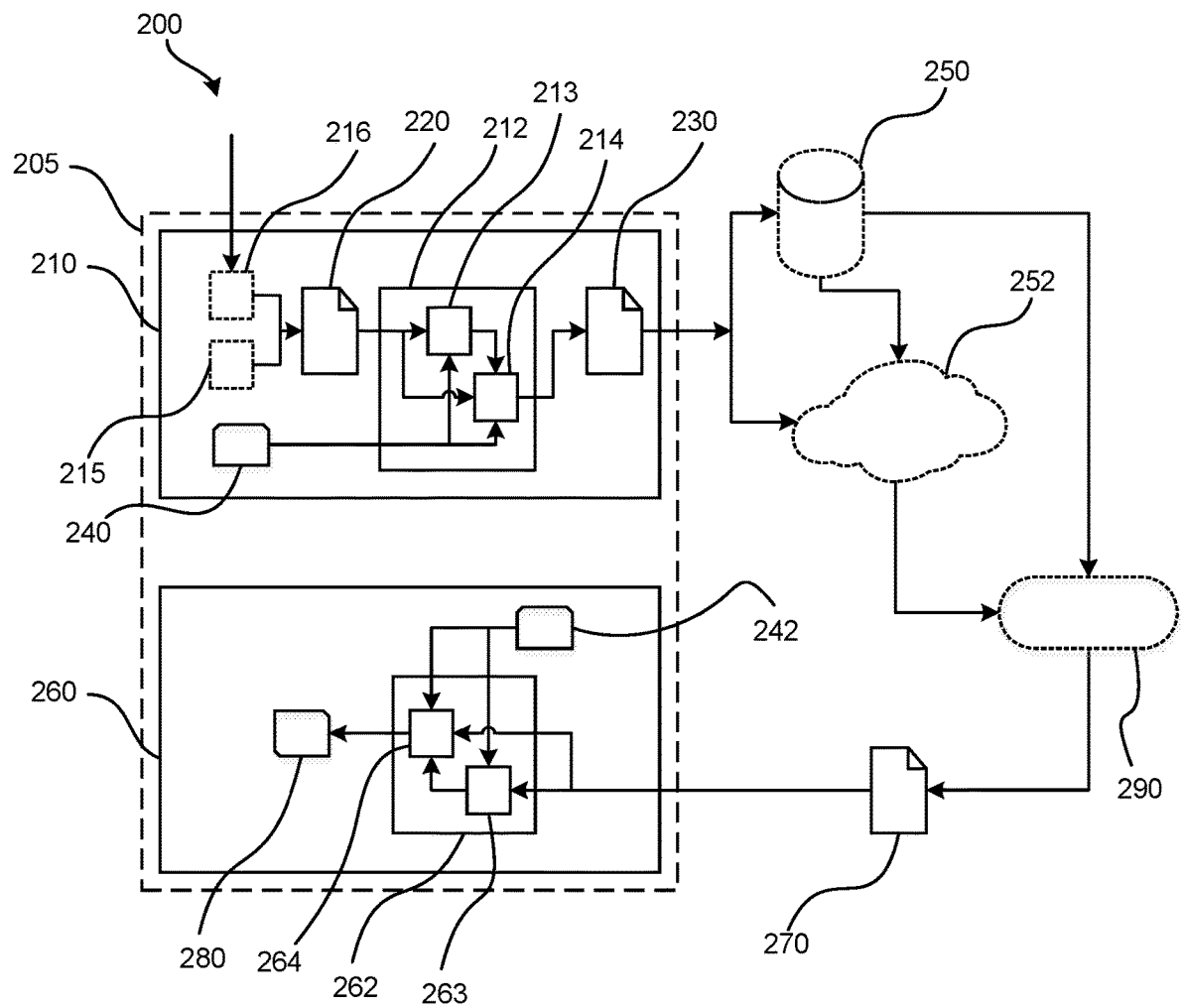
FIG. 2 schematically illustrates a watermarking system according to some embodiments of the invention.

FIG. 2 schematically illustrates a watermarking system 200 according to some embodiments of the invention. The watermarking system 200 comprises a watermark embedding system 210 (or a watermark embedder or encoder) and a watermark decoding system 260 (or a watermark detector). The watermark embedding system 210 and the watermark decoding system 260 may take the form of one or more computer systems 100 as shown in FIG. 1, although it will be appreciated that this is merely an example. Indeed, the watermark embedding system 210 and the watermark decoding system 260 may be implemented on the same computer system 100 and/or may be operated by the same entity and may, therefore, be viewed as a combined watermark embedding and decoding system, as illustrated by a dashed line 205 in FIG. 2. However, it will be appreciated that the watermark embedding system 210 and the watermark decoding system 260 may be implemented on different computer systems 100 and/or may be operated by the different entities and may, therefore, be viewed as a separate systems.

The watermark embedding system 210 comprises a watermarking module 212. The watermarking module 212 comprises a payload generating module 213 and a embedding module 214. The watermarking module 212 may be implemented as software executing on, say, a processor 108 of a computer system 100 that is part of (or that forms) the watermark embedding system 210 or as a hardware module of the watermark embedding system 210 or as a combination of both software and hardware. In operation, the watermarking module 212 is arranged to receive (or obtain or input) an initial item of content 220 and embed a payload within the item of content 220 to thereby generate a watermarked item of content 230. The payload generating module 213 is arranged to generate the payload based on the initial item of content 220. The embedding module 214 is arranged to embed the payload generated by the payload generating module 213 into the initial item of content 220 to thereby form the watermarked item of content 230. The nature of the payload shall be described later, as shall the method for embedding the payload (i.e. the watermark embedding algorithm).

The watermarking module 212 may make use of control data (or parameters or configuration settings) 240 to control or configure the watermarking module 212, such as controlling the method by which the payload generating module 213 forms the payload and/or the method by which the embedding module 214 embeds the payload into the initial item of content 220. However, it will be appreciated that some or all of these aspects/configurations of the watermarking module 212 may be preconfigured/predetermined, without requiring the control data 240.

Thus, in summary, the watermark embedding system 210 forms a watermarked item of content 230 from an initial item of content 220, where the watermarked item of content 230 comprises (or has embedded therein) a watermark that represents (or embeds or encodes or corresponds to) certain payload data.

In some embodiments, the watermark embedding system 210 may itself generate some or all of the initial item of content 220 and may, therefore, comprise a content generator 215. For example, the content generator 215 may comprise one or more cameras. Thus, for example, the watermark embedding system 210 may be a vehicle "dashcam" system comprising one or more cameras that generate video content 220 as the vehicle is being operated, with the watermarking module 212 watermarking the video content 220 as the video content 220 is captured, to generate watermarked content 230. As another example, the content generator 215 may comprise one or more microphones. The watermarking module 212 may then watermark audio content 220 as the audio content 220 is captured by the one or more microphones to generate watermarked content 230.

Additionally or alternatively, the watermark embedding system 210 may receive the initial item of content 220 from a source (not shown in FIG. 2) that is external to the watermark embedding system 210—thus, the watermark embedding system 210 may comprise an input 216 for receiving the initial item of content 220 from a source.

The watermark embedding system 210 may store the watermarked item of content 230 in a storage (or memory) 250. The storage 250 may be part of the watermark embedding system 210 or, as shown in FIG. 2, may be external to watermark embedding system 210. Additionally or alternatively, the watermark embedding system 210 may communicate (or transmit or provide) the watermarked item of content 230 to a third party (not shown in FIG. 2), for example via one or more networks 252. The one or more networks 252 may, for example, comprise one or more of: the internet, wide area networks, local area networks, metropolitan area networks, wireless networks, broadcast networks, telephone networks, cable networks, satellite networks, etc. As shown in FIG. 2, in some embodiments, the watermark embedding system 210 may store the watermarked item of content 230 in the storage (or memory) 250, with the watermarked item of content 230 being subsequently communicated (or transmitted or provided) to a third party (not shown in FIG. 2), for example via the one or more networks 252.

The watermark decoding system 260 comprises a watermark decoding module 262. The watermark decoding module 262 comprises a content analysis module 263 and a payload analysis module 264. The watermark decoding module 262 may be implemented as software executing on, say, a processor 108 of a computer system 100 that is part of (or that forms) the watermark decoding system 260 or as a hardware module of the watermark decoding system 260 or as a combination of both software and hardware.

In operation, the watermark decoding module 262 receives (or obtains or inputs) an item of content 270 to be "tested" (or processed or analysed), referred to herein for simplicity as the test item of content 270. In practice, the test item of content 270 will normally be a version of the watermarked item of content 230. In particular, the test item of content 270 may be the watermarked item of content 230 obtained (directly or indirectly) from the watermark embedding system 210, e.g. obtained via the network 252 or from the storage 250, with this being potentially via one or more third parties to whom the watermarked item of content 230 was initially or subsequently provided. It is possible that the watermarked item of content 230 may undergo one or more amounts of processing 290 before being provided as an input to the watermark decoding system 260 and, therefore, the test item of content 270 may not be exactly the same as the watermarked item of content 230. Such processing 290 could include, for example: data compression; insertion of additional data; deletion of data; changes to data values; format or standards conversion; etc. For example, if the watermarked item of content 230 comprises a video sequence, then the processing 290 could include one or more of: deletion of video frames/fields; insertion of video frames/fields; changes to frame rate; reordering of frames; changes to pixel values of the frames; data compression; change from one video format to another; colour conversion; cropping; one or more geometric transformations such as rotation, stretching, sheer, etc. The processing 290 may be part of a natural process flow for the watermarked item of content 230 (e.g. compression as part of data communication between different entities). Additionally or alternatively, the processing 290 may be malicious, in that an attacker may have processed or modified the watermarked item of content 230 with a view to achieving an unauthorized goal. It is, however, possible that the watermarked item of content 230 has not undergone any processing 290 before being provided as an input to the watermark decoding system 260 and, therefore, the test item of content 270 may be same as the watermarked item of content 230.

The aim of the watermark decoding system 260 is to detect modification of an item of content. In particular, the watermark decoding system 260 aims to determine whether one or more predetermined types of modification have been applied to the test item of content 270, i.e. whether or not the test item of content 270 has been arrived at (or formed/generated) by applying one or more predetermined types of modification to the watermarked item of content 230. Put another way, the watermark decoding system 260 aims to determine whether the test item of content 270 has undergone (or has had applied thereto) one or more predetermined types of modification (as part of processing 290) previously, i.e. since it was watermarked by the watermark embedding system 210.

The content analysis module 263 therefore performs a watermark decoding operation on the test item of content 270. The watermark decoding operation corresponds to the watermark embedding operation carried out by the embedding module 214. Depending on whether or not the watermark decoding operation is successful, the watermark decoding operation may produce (or generate) payload data from the test item of content 270. In particular, the watermarked item of content 230 may have undergone severe processing 290 to the extent that it is no longer possible to decode the initially embedded watermark from the test item of content 270. However, assuming that the watermark that was embedded is sufficiently robust and assuming that the processing 290 (if any) is not so severe that the watermark becomes undecodable, then the content analysis module 263 will generate a payload from the test item of content 270.

As shall be described in more detail shortly, the payload analysis module 264 is arranged to analyse the test item of content 270 and the payload produced by the content analysis module 263, to thereby generate a result 280 that (as shall be described shortly) indicates whether or not one or more predetermined types of modification have not been applied to the test item of content 270.

The watermark decoding module 262 may make use of control data (or parameters or configuration settings) 242 to control or configure the watermark decoding module 262, such as controlling the method by which the content analysis module 263 attempts to decode a payload from the test item of content 270 and/or the method by which the payload analysis module 264 performs its analysis. However, it will be appreciated that some or all of these aspects/configurations of the watermark decoding module 262 may be pre-configured/predetermined, without requiring the control data 242. In some embodiments, at least some of the control data 240 used by the watermarking module 212 may be the same as at least some of the control data 242 used by the watermark decoding module 262.

Thus, in summary, the watermark decoding system 260 receives an item of content 270, performs a watermark decoding operation on the item of content 270 and, in response to the watermark decoding operation producing a payload from the item of content 270, determines whether or not one or more predetermined types of modification have not been applied to the item of content.

Different types of modification (i.e. changes applied by the processing 290) will affect one or more respective aspects (or properties or characteristics) of the watermarked item of content 230, with these changes being reflected in the test item of content 270. In other words, for each type of modification there is a corresponding set of one or more aspects of an item of content that will be affected or changed due to application of that modification to the item of content. Thus, it is possible to identify whether or not a particular type of modification has been applied by knowing (a) the value(s) for the corresponding one or more aspects of the initial item of content 220 and (b) the value(s) for the corresponding one or more aspects of the test item of content 270. If the value(s) for the corresponding one or more aspects of the initial item of content 220 match (or equal) the value(s) for the corresponding one or more aspects of the test item of content 270, then it can be concluded that that particular type of modification has not been applied; if the value(s) for the corresponding one or more aspects of the initial item of content 220 do not match (or equal) the value(s) for the corresponding one or more aspects of the test item of content 270, then it can be concluded that that particular type of modification may have been applied.

For example, for video content:
A modification involving a change of video standard or pixel format may affect aspects such as:
Aspect ratio, such as changes between 4:3, 16:9, 3:2, 5:3, 5:3, 1:1 etc.

Resolution, such as changes between 1920×1080, 1280×720, 720×576, etc.

Pixel depth, such as 8 bits-per-pixel (bpp), 10 bpp, 12 bpp, etc.

Colour format, such as RGB, YUV, 4:4:4, 4:2:2, 4:2:0, etc.

Frame rate, such as 25 frames per second (fps), 30 fps, etc.

Whether or not the video content is interlaced

Etc.

A modification to the actual content making up the video content may affect aspects such as:

The number of frames making up the video content

The number of GOPs making up the video content

The number of scene changes/cuts in the video content

The sequential order for frames of video content

Etc.

For example, for audio content:

A modification involving a change of audio standard/format may affect aspects such as:

Sampling frequency

Audio sample bit depth

Number of audio channels

Etc.

A modification to the actual content making up the audio content may affect aspects such as:

The duration of the audio content

The number of segments making up the audio content

The number of "quiet" periods in the audio content

The sequential order for segments of audio content

Etc.

Of course, more specific types of modification could be specified. For example, in some embodiments, the modification of interest (i.e. to be checked for) may be a change in aspect ratio, in which case the corresponding set of attributes is just the value for the aspect ratio.

The aim of the watermarking system 200 is to enable detection of modification of an item of content. Different embodiments of the invention may aim to enable detection of different types of modification (depending, for example, on the specific deployment scenario and issue of concern). Some embodiments may aim to enable detection of just one type of modification; other embodiments may aim to enable detection of one or more of multiple types of modification. Thus, embodiments of the invention relate to one or more predetermined types of modification, and, as discussed above, for each predetermined type of modification, that type of modification affects the value of at least one corresponding attribute of an item of content. Thus, embodiments of the invention make use of an overall set of attributes for the item of content, where each of the one or more predetermined types of modification for that embodiment affects the value of at least one attribute in this overall set of one or more attributes. Thus, give the particular one or more predetermined types of modification for a particular embodiment of the invention, a set of one or more attributes can be selected such that, for each of the one or more predetermined types of modification, that type of modification affects the value of at least one attribute in the set of one or more attributes.

Figure 3A:
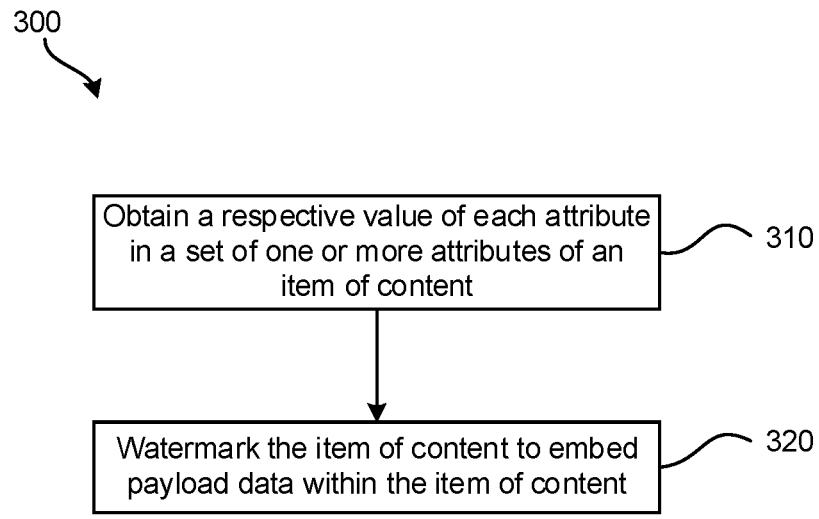
FIGS. 3a and 3b are flowcharts illustrating methods performed by a watermark embedding system, according to some embodiments of the invention.

FIG. 3*a* is a flowchart illustrating a method 300 performed by the watermark embedding system 210, according to some embodiments of the invention.

At a step 310, the watermark embedding system 210 obtains, for the initial item of content 220, a respective value of each attribute in a set of one or more attributes of the initial item of content 220. As discussed above, the set of one or more attributes is selected such that, for each of one or more predetermined types of modification, that type of modification affects the value of at least one attribute in the set of one or more attributes. In some embodiments, the set of one or more attributes, and/or the manner by which they are obtained, may be specified by the control data 240.

The watermark embedding system 210 may obtain the attribute value(s) in a variety of manners, such as one or more of:

The watermark embedding system 210 may obtain, by itself generating, some or all of the attribute values. For example, the payload generating module 213 may analyze the initial item of content 220 to generate (or establish or calculate) some or all of the attribute values based on the initial item of content 220. Additionally or alternatively, the content generator 215 may determine (or establish or calculate) some or all of the attribute values as part of generating the initial item of content 220.

The watermark embedding system 210 may obtain, by receiving, some or all of the attribute values. For example, the watermark embedding system 210 may receive the some or all of the attribute values from a source that is external to the watermark embedding system 210, via the input 216. Additionally or alternatively, the initial item of content 220 may comprise, as metadata or as embedded parameters, one or more of the attribute values—thus, for example, an initial item of content 220 received via the input 216 may already contain one or more of the attribute values (so that the watermark embedding system 210 may parse the initial item of content 220 to obtain these values).

Some or all of the attribute values may be predetermined—for example, the watermark embedding system 210 may be configured to only operate with video at a certain frame rate or with audio at a certain sample frequency. Thus, obtaining the respective values for such attributes may involve reading such predetermined values from memory or using an embedded version of such parameters. Likewise, the respective values for such attributes may be specified as part of the control data 240.

At a step 320, the watermark embedding system 210 watermarks the initial item of content 220 to embed payload data within the initial item of content 220. As discussed above, the embedding module 214 may watermark the initial item of content 220 to embed the payload data within the item of content 220.

In the example method 300 shown in FIG. 3*a*, the payload data comprises the respective value for each attribute in the set of one or more attributes. Thus, at the step 320 in FIG. 3*a*, the initial item of content 220 is watermarked so that it contains, or has encoded or embedded therein, the respective value for each attribute in the set of one or more attributes.

As mentioned above, the payload data may be generated by the payload generating module 213. The payload generating module 213 may represent the one or more attributes values as payload data in any suitable manner (e.g. a concatenation of some or all of the values). The payload generating module 213 may perform further processing on the one or attributes values (e.g. error correction encoding, encryption, etc.).

It will be appreciated that methods of watermarking an item of content per se are well known in this field of technology and that any such watermarking method may be chosen. Preferably, the particular watermarking algorithm used is chosen according to the particular deployment scenario envisaged by particular embodiments of the invention. In particular, it will usually be desirable for the watermarking algorithm to be (i) (substantially) imperceptible to a human user and/or (ii) robust against certain types of modification (which may or may not be one or more of the above-mentioned predetermined types of modification).

Different attributes may have their respective values embedded in different ways and/or at different frequencies throughout the initial item of content 220. For example, for video content, the attribute may be the sequential frame number for each frame of the video content (e.g. if one of the predetermined types of modification involves reordering video frames, deletion of video frames, or insertion of video frames), in which case at least some of the payload data that is generated may change from frame to frame, so that a watermark may be embedded in each frame with payload data for that watermark representing that frame's sequential frame number. However, for an attribute that may remain constant throughout the video content (e.g. video encoding format or number of GOPs), the value for that attribute may be embedded once or multiple times throughout the video content (e.g. once every $n^{th}$ video frame for some integer $n≥1$). Thus, the step 320 may involve generating one or more amounts of payload data and embedding each amount of payload data at one or more respective locations in the initial item of content 220, with each amount of payload data representing the value of one or more corresponding attributes from the set of one or more attributes of the initial item of content 220.

Figure 4A:
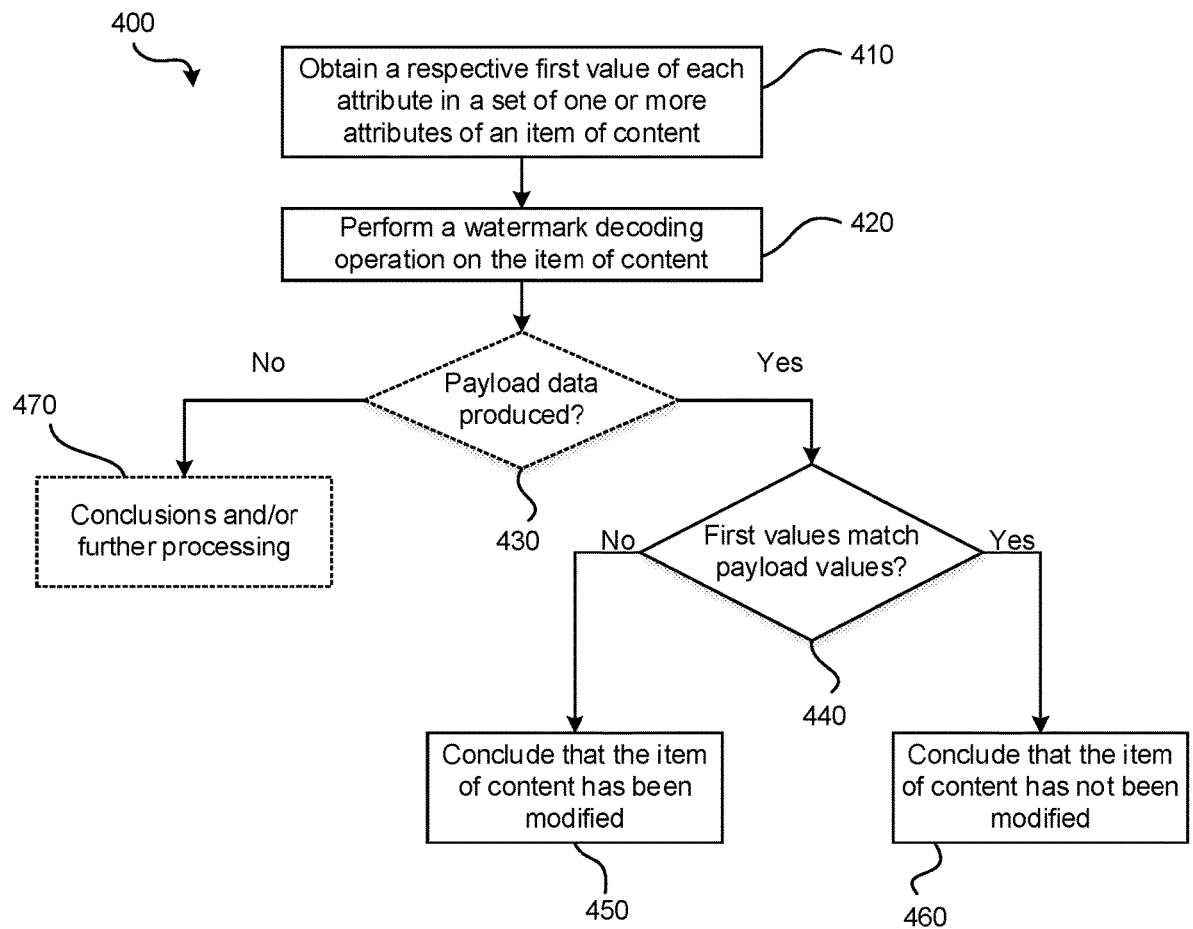
FIGS. 4a and 4b are flowcharts illustrating methods performed by a watermark decoding system, according to some embodiments of the invention.

FIG. 4a is a flowchart illustrating a method 400 performed by the watermark decoding system 260, according to some embodiments of the invention.

At a step 410, the watermark decoding system 260 obtains, for the test item of content 270, a respective first value of each attribute in the above-mentioned set of one or more attributes. This may be performed by the payload analysis module 264 and/or the content analysis module 263. The watermark decoding system 260 may obtain these first attribute values in a variety of manners, such as one or more of:

The watermark decoding system 260 may obtain, by itself generating, some or all of the first values. For example, the payload analysis module 264 and/or the content analysis module 263 may analyze the test item of content 270 to generate (or establish or calculate) some or all of the first values based on the test item of content 270.

The watermark decoding system 260 may obtain, by receiving, some or all of the first values. For example, the watermark decoding system 260 may receive the first attribute values from a source that is external to the watermark decoding system 260, via an input (not shown in FIG. 2). Additionally or alternatively, the test item of content 270 may comprise, as metadata or as embedded parameters, one or more of the first attribute values—thus, for example, a test item of content 270 received via an input (not shown in FIG. 2) may already contain one or more of the first attribute values.

Some or all of the first attribute values may be predetermined—for example, the watermark decoding system 260 may be configured to only operate with video at a certain frame rate or audio at a certain sample frequency. Thus, obtaining the first values for such attributes may involve reading such predetermined values from memory or using an embedded version of such parameters. Likewise, the first attribute values for such attributes may be specified as part of the control data 242.

At a step 420, the watermark decoding system 260 performs a watermark decoding operation on the test item of content 270. As discussed above, the content analysis module 263 may perform the watermark decoding operation on the test item of content 270.

It will be appreciated that watermark decoding operations per se are well known in this field of technology and that any such watermark decoding method may be chosen. The watermark decoding operation corresponds to the watermark embedding operation carried out by the watermark embedding module 214, insofar as the watermark decoding operation is capable of producing (or regenerating), from the watermarked item of content 230, the payload data that was embedded (by the watermark embedding operation) into the initial item of content 220 when producing the watermarked item of content 230.

In some embodiments, the watermark decoding operation will always produce payload data from the test item of content 270; in other embodiments, the watermark decoding operation may sometimes not be able to produce payload data (e.g. if it involves performing error correction decoding and there are too many errors to successfully correct). This depends on the particular implementation of the watermark decoding operation. In embodiments in which payload data is always produced by the watermark decoding operation, processing continues at a step 440; otherwise, processing continues at an optional step 430.

At the optional step 430, a determination is made as to whether the watermark decoding operation produced payload data from the test item of content 270. If it is determined that the watermark decoding operation has produced payload data from the test item of content 270, then processing continues at the step 440; otherwise processing continues at an optional step 470.

The step 430 is optional insofar as, in some embodiments, one or more of the following may be satisfied: (a) the determination of whether the watermark decoding operation produced payload data from the test item of content 270 may comprise a part of the watermark decoding operation performed at the step 420; and (b) as mentioned above, the watermark decoding operation may always produce payload data from the test item of content 270.

Thus, the step 440 is reached in response to the watermark decoding operation producing payload data from the test item of content 270 (be that directly from the step 420 or via the optional step 430). Since the payload data embedded by the watermark embedding process comprises (or represents) values for the one or more attributes in the set of one or more attributes, the payload data decoded by the corresponding watermark decoding operation will, likewise, comprise (or represent) values (referred to below as "second values") for these one or more attributes.

At the step 440, the watermark decoding system 260 determines whether, for each attribute in the set of one or more attributes, the respective first value for that attribute (as ascertained at the step 410) matches a respective second value for that attribute determined using the payload data. As discussed above, this may be performed by the payload analysis module 264. In some embodiments, the respective first and second values for an attribute may be considered to match only if they are equal to one another. In some embodiment, the respective first and second values for an attribute may be considered to match if a difference (or a magnitude thereof) between those first and second values is less than a predetermined threshold (e.g. less than an expected error in the respective first and second values; and/or a threshold based on the item of content, such as its duration). The nature of what is considered to be a "match" and/or the threshold value to use may specified by the control data 242.

If it is determined that, for at least one attribute in the set of one or more attributes, the respective first value for that attribute does not match the corresponding respective second value for that attribute, then processing continue to at step 450 at which it is concluded that at least one of the predetermined types of modification has been applied to the watermarked item of content 230 to arrive at the test item of content 270, i.e. that the test item of content 270 has had applied thereto at least one of the predetermined types of modification.

Otherwise, if it is determined that, for each attribute in the set of one or more attributes, the respective first value for that attribute matches the corresponding respective second value for that attribute, then processing continue to at step 460 at which it is concluded that the one or more predetermined types of modification have not been applied to the watermarked item of content 230 to arrive at the test item of content 270, i.e. that the test item of content 270 has not had applied thereto any of the one or more predetermined types of modification.

In some embodiments, the step 450 may, instead, involve determining that some form of modification has been made to the watermarked item of content 230 to arrive at the test item of content 270, although it may not be decided conclusively that the one or more predetermined types of modification have been applied—this will, of course, depend on the nature of the predetermined types of modification and the attributes used.

At the optional step 470, one or more conclusions may be drawn, and/or one or more further processing steps may be taken, such as one or more of:
  The watermark decoding operation may not have produced payload data from the test item of content 270 due to an error (or fault) in the watermark decoding operation. The step 470 may, therefore, comprise remedying the error in the watermark decoding operation (e.g. the control data 242 may be adjusted) and returning to the step 420.
  It may be concluded that the test item of content 270 has been modified to such an extent by the processing 290 that payload data cannot be detected in the test item of content 270. In this case, the control data 240 for future watermark embedding operations may be adjusted (e.g. to increase the robustness of the watermark).
  It may be concluded that the test item of content 270 is a version of the initial content 220 that was obtained illicitly prior to the watermark embedding operation being performed.
  It may be determined that further inspection, for example visual inspection, is required to draw a conclusion as to the derivation/provenance of the test item of content 270.

It will be appreciated that in some embodiments, additional data may be required before any such conclusion is reached and/or before any further processing takes place.

Figure 5:
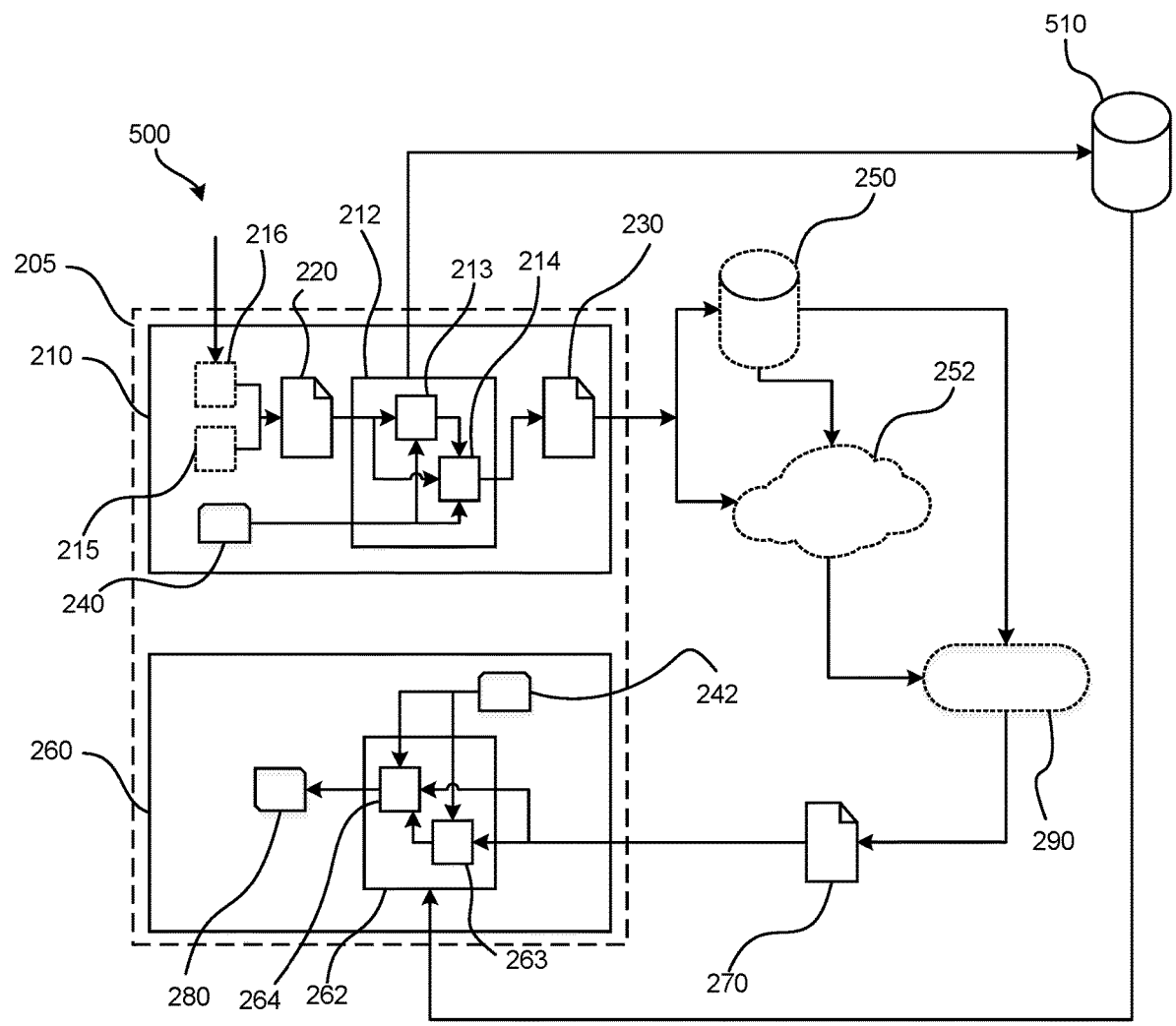
FIG. 5 schematically illustrates another watermarking system according to some embodiments of the invention.

FIG. 5 schematically illustrates a watermarking system 500 according to some embodiments of the invention. The watermarking system 500 is the same as the watermarking system 200 of FIG. 2 (with like elements having the same reference numeral), except as discussed below.

The watermarking system 500 further comprises a storage (or memory or database) 510. The storage 510 may be part of the watermark embedding system 210 or, as shown in FIG. 2, may be external to watermark embedding system 210 and could, for example, be accessible to the watermark embedding system 210 via the network 252. Similarly, the storage 510 may be part of the watermark decoding system 260 or, as shown in FIG. 2, may be external to watermark decoding system 260 and could, for example, be accessible to the watermark decoding system 260 via the network 252.

As discussed above, the watermarking module 212 is arranged to obtain, for the initial item of content 220, a respective value of each attribute in the set of one or more attributes of the initial item of content 220. With the system 500, the watermarking module 212 stores these values in the storage 510 in association with an identifier (for example as a record in a database having a unique record identifier). The payload data generated by the payload generating module 213 and which subsequently gets embedded into the initial item of content 220 by the embedding module 214 to generate the watermarked item of content 230 may then, instead of comprising the attribute values per se (as in the system 200), comprise the identifier (or a representation thereof). As discussed above, the watermark decoding operation performed by the watermark decoding module 262 generates payload data from the test item of content 270—in the system 500, this payload data will then comprise this identifier (or a representation thereof). The watermark decoding module 262 may then use the identifier obtained based on the payload data to access the attributes values stored in the storage 510—these accessed attributes then become the above-mentioned "second values" for the attributes.

Figure 3B:
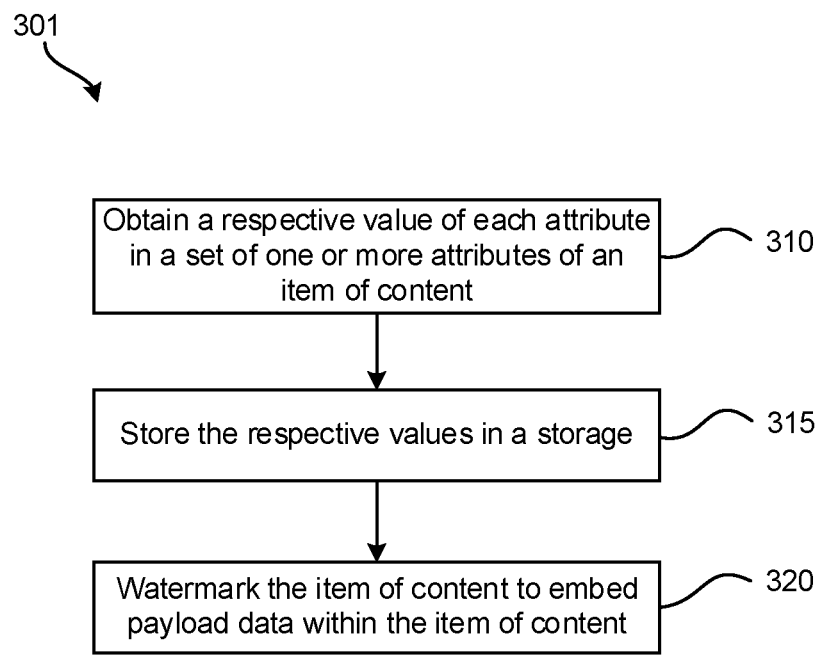

FIG. 3b is a flowchart illustrating a method 301 performed by the watermark embedding system 210, according to some embodiments of the invention when using the system 500 of FIG. 5. FIG. 3b comprises the steps 310 and 320, which are analogous to steps 310 and 320 of FIG. 3a. FIG. 3b further comprises a step 315 at which the watermark embedding system 210 stores the attribute values, obtained at a step 310, in the storage 510. As discussed above with reference to FIG. 5, in the method 301 shown in FIG. 3b, the payload data comprises an identifier for retrieving, from a storage 510, the respective value for each attribute in the set of one or more attributes. Thus, at the step 320 in FIG. 3b, the initial item of content 220 is watermarked so that it contains, or has encoded or embedded therein, an identifier for retrieving, from the storage 510, the respective value for each attribute in the set of one or more attributes.

Figure 4B:
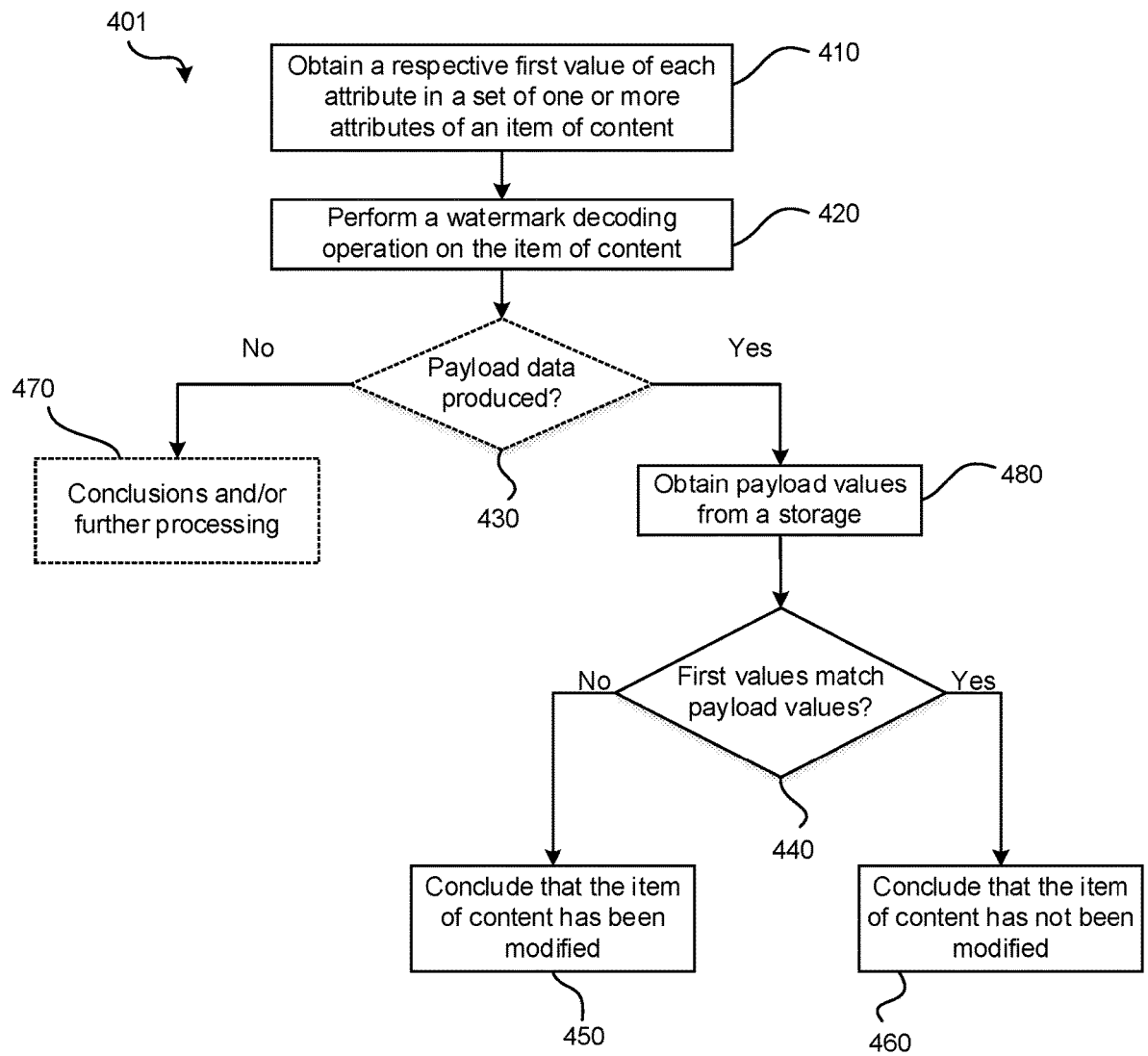

FIG. 4b is a flowchart illustrating a method 401 performed by the watermark decoding system 260, according to some embodiments of the invention when using the system 500 of FIG. 5. FIG. 4b comprises the steps 410-470, which are analogous to steps 410-470 of FIG. 4a. As discussed above, the payload data produced by the watermark decoding operation performed at the step 420 comprises an identifier for retrieving, from the storage 510, a respective second value for each attribute in the set of one or more attributes. Thus, FIG. 4b further comprises a step 480 at which the watermark decoding system 260 uses the identifier from the payload data to obtain, from the storage 510, the respective second value of each attribute in a set of one or more attributes of the test item of content 270.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or one or more graphical processing units (GPUs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method for enabling detection of modification of an item of content, the method comprising:
    selecting one or more predetermined types of modification for detection;
    selecting a set of one or more attributes for the item of content such that, for each of the one or more predetermined types of modification, said type of modification affects the value of at least one attribute in the set of one or more attributes;
    obtaining, for the item of content, a respective value of each attribute in the set of one or more attributes; and
    watermarking the item of content to embed payload data within the item of content, wherein the payload data comprises (a) the respective value for each attribute in the set of one or more attributes and/or (b) an identifier for retrieving, from a storage, the respective value for each attribute in the set of one or more attributes.

2. The method of claim 1, further comprising storing, in the storage, the respective value of each attribute in the set of one or more attributes.

3. A method for detection of modification of an item of content, the method comprising:
    obtaining, for the item of content, a respective first value of each attribute in a set of one or more attributes of the item of content, the set of one or more attributes selected such that, for each of one or more predetermined types of modification, said type of modification affects the value of at least one attribute in the set of one or more attributes;
    performing a watermark decoding operation on the item of content; and
    in response to the watermark decoding operation producing payload data from the item of content:
        determining that at least one specific type of the one or more predetermined types of modification have not been applied to the item of content when, for each attribute in the set of one or more attributes, the respective first value for that attribute matches a respective second value for that attribute determined using the payload data; or
        determining that at least one specific type of modification has been applied to the item of content when, for at least one attribute in the set of one or more attributes that corresponds to the at least one specific type of modification, the respective first value for that attribute does not match a respective second value for that attribute determined using the payload data.

4. The method of claim 3, wherein determining that a modification has been applied to the item of content comprises determining that at least one of the one or more predetermined types of modification has been applied to the item of content when, for at least one attribute in the set of one or more attributes, the respective first value for that attribute does not match a respective second value for that attribute determined using the payload data.

5. The method of claim 3, wherein the respective first value for an attribute matches a respective second value for that attribute when either:
    (a) the first value equals the second value; or
    (b) a difference between the first value and the second values is less than a predetermined threshold.

6. The method of claim 3, further comprising using the payload data to obtain, from a storage, the respective second value for each attribute in the set of one or more attributes of the item of content.

7. The method of claim 6, wherein the payload data comprises an identifier of a record in a database storing the respective second value for each attribute in the set of one or more attributes of the item of content.

8. The method of claim 3, wherein the one or more predetermined types of modification comprises one or more of:

(a) a change in standard or format of the item of content;
(b) a change to the contents of the item of content.

9. The method of claim 1, wherein the one or more predetermined types of modification comprises one or more of:
(a) a change in standard or format of the item of content;
(b) a change to the contents of the item of content.

10. A system for enabling detection of modification of an item of content, the system comprising one or more processors arranged to:
selecting one or more predetermined types of modification for detection;
select a set of one or more attributes for the item of content such that, for each of the one or more predetermined types of modification, said type of modification affects the value of at least one attribute in the set of one or more attributes;
obtain, for the item of content, a respective value of each attribute in the set of one or more attributes; and
watermark the item of content to embed payload data within the item of content, wherein the payload data comprises (a) the respective value for each attribute in the set of one or more attributes and/or (b) an identifier for retrieving, from a storage, the respective value for each attribute in the set of one or more attributes.

11. The system of claim 10, further arranged to store, in the storage, the respective value of each attribute in the set of one or more attributes.

12. The system of claim 10, wherein the one or more predetermined types of modification comprises one or more of:
(a) a change in standard or format of the item of content;
(b) a change to the contents of the item of content.

13. A system for detection of modification of an item of content, the system comprising one or more processors arranged to:
obtain, for the item of content, a respective first value of each attribute in a set of one or more attributes of the item of content, the set of one or more attributes selected such that, for each of one or more predetermined types of modification, said type of modification affects the value of at least one attribute in the set of one or more attributes;
perform a watermark decoding operation on the item of content; and
in response to the watermark decoding operation producing payload data from the item of content:
determine that at least one specific type of the one or more predetermined types of modification have not been applied to the item of content when, for each attribute in the set of one or more attributes, the respective first value for that attribute matches a respective second value for that attribute determined using the payload data; or
determine that at least one specific type of modification has been applied to the item of content when, for at least one attribute in the set of one or more attributes, the respective first value for that attribute does not match a respective second value for that attribute determined using the payload data.

14. The system of claim 13, wherein determining that a modification has been applied to the item of content comprises determining that at least one of the one or more predetermined types of modification has been applied to the item of content when, for at least one attribute in the set of one or more attributes, the respective first value for that attribute does not match a respective second value for that attribute determined using the payload data.

15. The system of claim 13, wherein the respective first value for an attribute matches a respective second value for that attribute when either:
(a) the first value equals the second value; or
(b) a difference between the first value and the second values is less than a predetermined threshold.

16. The system of claim 13, further arranged to use the payload data to obtain, from a storage, the respective second value for each attribute in the set of one or more attributes of the item of content.

17. The system of claim 16, wherein the payload data comprises an identifier of a record in a database storing the respective second value for each attribute in the set of one or more attributes of the item of content.

18. The system of claim 13, wherein the one or more predetermined types of modification comprises one or more of:
(a) a change in standard or format of the item of content;
(b) a change to the contents of the item of content.

19. A non-transitory computer readable medium storing a computer program which, when executed by one or more processors, causes the one or more processors to carry out a method for enabling detection of modification of an item of content, the method comprising:
selecting one or more predetermined types of modification for detection;
selecting a set of one or more attributes for the item of content such that, for each of the one or more predetermined types of modification, said type of modification affects the value of at least one attribute in the set of one or more attributes;
obtaining, for the item of content, a respective value of each attribute in the set of one or more attributes; and
watermarking the item of content to embed payload data within the item of content, wherein the payload data comprises (a) the respective value for each attribute in the set of one or more attributes and/or (b) an identifier for retrieving, from a storage, the respective value for each attribute in the set of one or more attributes.

20. A non-transitory computer readable medium storing a computer program which, when executed by one or more processors, causes the one or more processors to carry out a method for detection of modification of an item of content, the method comprising:
obtaining, for the item of content, a respective first value of each attribute in a set of one or more attributes of the item of content, the set of one or more attributes selected such that, for each of one or more predetermined types of modification, said type of modification affects the value of at least one attribute in the set of one or more attributes;
performing a watermark decoding operation on the item of content; and
in response to the watermark decoding operation producing payload data from the item of content:
determining that at least one specific type of the one or more predetermined types of modification have not been applied to the item of content when, for each attribute in the set of one or more attributes, the respective first value for that attribute matches a respective second value for that attribute determined using the payload data; or
determining that at least one specific type of modification has been applied to the item of content when, for at least one attribute in the set of one or more attributes, the respective first value for that attribute does not match a respective second value for that attribute determined using the payload data.

* * * * *